US011654723B2

United States Patent
Nakajima

(10) Patent No.: US 11,654,723 B2
(45) Date of Patent: May 23, 2023

(54) TIRE

(71) Applicant: Sumitomo Rubber Industries, Ltd., Hyogo (JP)

(72) Inventor: Koichi Nakajima, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 17/656,410

(22) Filed: Mar. 24, 2022

(65) Prior Publication Data

US 2022/0324263 A1 Oct. 13, 2022

(30) Foreign Application Priority Data

Apr. 8, 2021 (JP) .............................. JP2021-066058

(51) Int. Cl.
*B60C 11/13* (2006.01)
*B60C 11/11* (2006.01)

(52) U.S. Cl.
CPC ........... *B60C 11/11* (2013.01); *B60C 11/1392* (2013.01)

(58) Field of Classification Search
CPC .................. B60C 11/1384; B60C 11/1392
See application file for complete search history.

(56) References Cited

U.S. PATENT DOCUMENTS

| 6,138,728 | A   | * | 10/2000 | Miyazaki | ............... | B60C 11/13 |
|           |     |   |         |          |                | 152/209.15 |
| 2010/0000643 | A1 | * | 1/2010 | Minoli  | ............... | B60C 11/1392 |
|           |     |   |         |          |                | 152/209.15 |
| 2010/0236679 | A1 | * | 9/2010 | Miyazaki | ............ | B60C 11/0302 |
|           |     |   |         |          |                | 152/209.15 |
| 2016/0121659 | A1 | * | 5/2016 | Kageyama | .............. | B60C 11/11 |
|           |     |   |         |          |                | 152/209.24 |
| 2016/0193881 | A1 |   | 7/2016 | Nakayama |                |            |
| 2020/0247191 | A1 | * | 8/2020 | Nakajima | ........... | B60C 11/0306 |

FOREIGN PATENT DOCUMENTS

| EP | 1870258 | A2 | * | 12/2007 | ............... | B60C 11/11 |
| EP | 2402177 | A2 | * | 1/2012 | ......... | B60C 11/1384 |
| EP | 3015287 | A2 |   | 5/2016 |
| EP | 3536521 | A1 |   | 9/2019 |

(Continued)

OTHER PUBLICATIONS

Machine Translation: EP-1870258-A2, Fischer M, (Year: 2023).*

(Continued)

*Primary Examiner* — Kendra Ly

(74) *Attorney, Agent, or Firm* — Studebaker & Brackett PC

(57) ABSTRACT

A tire 1 includes a tread portion 2 provided with a block 3. A block corner portion 5 of the block 3 has a stepped chamfered portion 7 formed therein in which a block height decreases stepwise from a tread surface 3a toward a top portion 3b. The stepped chamfered portion 7 includes upper surfaces 10 parallel to the tread surface 3a, and step corner portions 12 each formed so as to protrude toward a block outer side as a result of the upper surface 10 and a vertical surface 11 or the vertical surface 11 and the tread surface 3a intersecting each other. An angle θ1 between the tread surface 3a and a virtual straight line n3 connecting the step corner portions 12 in a vertical cross-sectional view, of the block corner portion 5, passing through the top portion 3b is 10 to 40 degrees.

18 Claims, 5 Drawing Sheets

(56) References Cited

FOREIGN PATENT DOCUMENTS

| JP | 11157308 A | * | 6/1999 | |
|---|---|---|---|---|
| JP | 11263104 A | * | 9/1999 | ............. B60C 11/13 |
| JP | 2002029222 A | * | 1/2002 | ......... B60C 11/1384 |
| JP | 2009061865 A | * | 3/2009 | |
| JP | 2013082263 A | * | 5/2013 | ......... B60C 11/1392 |
| JP | 2013216118 A | * | 10/2013 | |
| JP | 2016-124504 A | | 7/2016 | |
| WO | 2012/043036 A1 | | 4/2012 | |

OTHER PUBLICATIONS

Machine Translation: EP-2402177-A2, Lampe O, (Year: 2023).*
Machine Translation: JP-11263104-A, Fukuoka T, (Year: 2023).*
Machine Translation: JP-2002029222-A, Kiwaki K, (Year: 2023).*
Machine Translation: JP-2009061865-A, Honda T, (Year: 2023).*
Machine Translation: JP-2013216118-A, Matsushita K, (Year: 2023).*
Machine Translation: JP-11157308-A, Hino H, (Year: 2023).*
Machine Translation: JP-2013082263-A, Ohashi T, (Year: 2023).*
The extended European search report issued by the European Patent Office dated Jun. 27, 2022, which corresponds to European Patnet Application No. 22164136.8-1012 and is related to U.S. Appl. No. 17/656,410.

* cited by examiner

TIRE

CROSS REFERENCE TO RELATED APPLICATION(S)

The present application claims priority to Japanese patent application JP 2021-066058, filed on Apr. 8, 2021, the entire contents of which is incorporated herein by reference in its entirety.

BACKGROUND

Technical Field

The present disclosure relates to a tire.

Description of the Background Art

Japanese Laid-Open Patent Publication No. 2016-124504 describes a pneumatic tire having blocks provided in a tread portion. The blocks include constricted blocks each having recesses on side surfaces in the tire axial direction. Each of the recesses is defined by a V-shaped edge that protrudes toward the block center side. During running on snow, such a V-shaped recess traps snow therein, and compacts the trapped snow by compression deformation, to form a hard snow column. Therefore, the pneumatic tire of Japanese Laid-Open Patent Publication No. 2016-124504 is said to have excellent on-snow performance.

In recent years, further improvement of the snow road performance of tires has been desired. The inventors have conducted various experiments, and as a result, the inventors have found that snow road performance can be improved by modifying block corner portions of a tread portion.

The present disclosure has been made in view of the above circumstances, and a main object of the present disclosure is to provide a tire having improved snow road performance.

SUMMARY

The present disclosure is directed to a tire including a tread portion, wherein: the tread portion is provided with a block having a tread surface; the block has a block corner portion including a top portion protruding toward an outer side of the block, in a tread plan view; the block corner portion has a stepped chamfered portion formed therein in which a block height decreases stepwise from the tread surface toward the top portion; the stepped chamfered portion includes a plurality of upper surfaces substantially parallel to the tread surface, a plurality of vertical surfaces extending in a block height direction, and a plurality of step corner portions each formed so as to protrude toward the outer side of the block as a result of the upper surface and the vertical surface or the vertical surface and the tread surface intersecting each other; and an angle between the tread surface and a virtual straight line connecting the plurality of step corner portions in a vertical cross-sectional view, of the block corner portion, passing through the top portion is 10 to 40 degrees.

DESCRIPTION OF THE PREFERRED EMBODIMENTS

Hereinafter, an embodiment of the present disclosure will be described with reference to the drawings.

Figure 1:
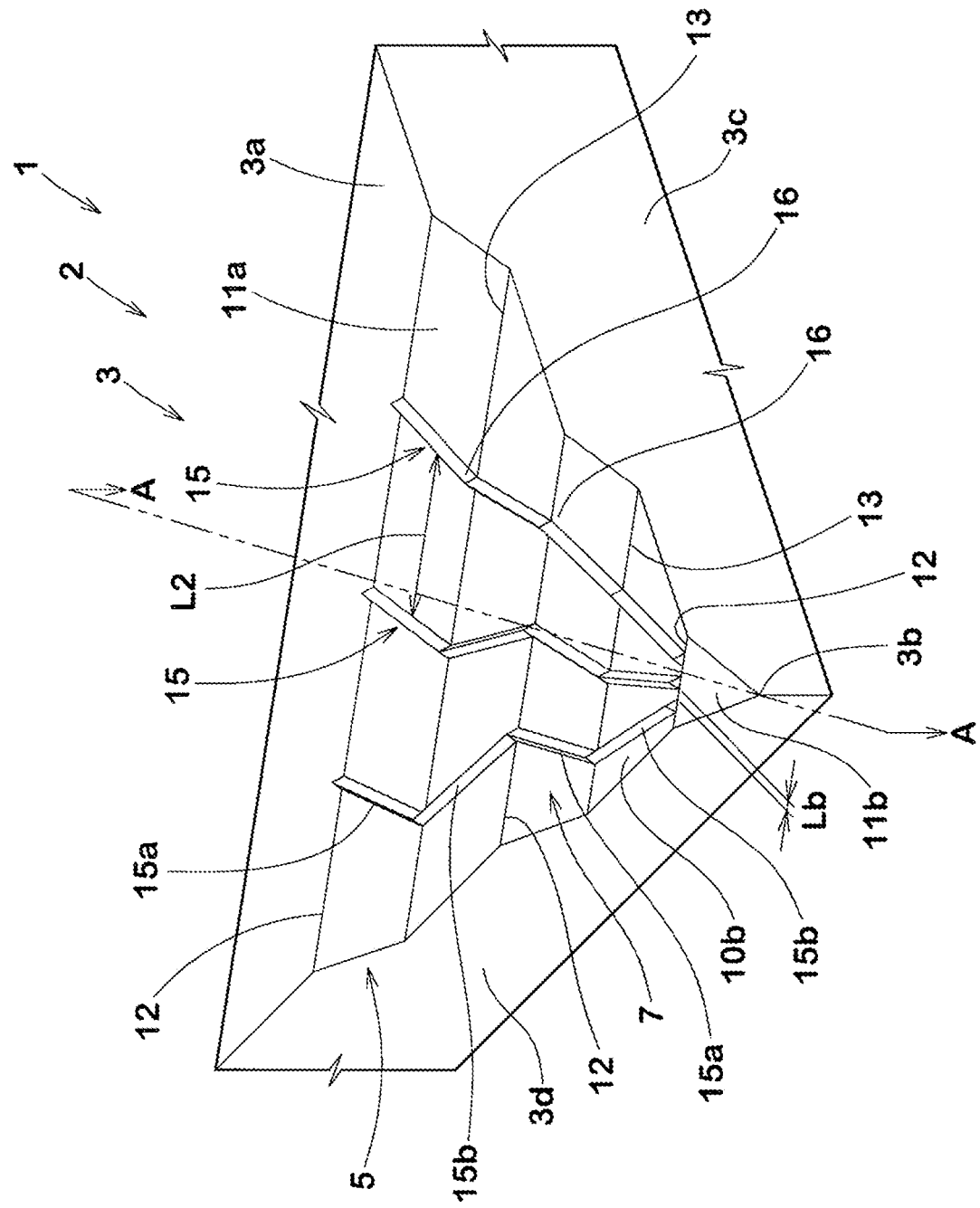
FIG. 1 is a partial perspective view of a block of a tire according to an embodiment of the present disclosure.

FIG. 1 is a partial perspective view of a block 3 provided in a tread portion 2 of a tire 1 according to the present embodiment. FIG. 1 shows a block 3 of a pneumatic tire 1 for a passenger car as a preferable mode. However, the present disclosure can also be applied to, for example, a pneumatic tire for a heavy-duty vehicle and tires in the other categories.

As shown in FIG. 1, in the present embodiment, the block 3 includes a tread surface 3a which comes into contact with a road surface, and a top portion 3b which protrudes toward the outer side of the block 3 in a tread plan view. The block 3 also includes a wall surface (first wall surface) 3c which extends from the top portion 3b toward one side, and a wall surface (second wall surface) 3d which extends from the top portion 3b toward the other side.

The block 3 of the present embodiment has a block corner portion 5 which includes the top portion 3b. The block corner portion 5 has a stepped chamfered portion 7 formed therein in which the block height decreases stepwise from the tread surface 3a toward the top portion 3b. Such a stepped chamfered portion 7 treads snow and increases a snow column shearing force. The stepped chamfered portion 7 is formed, for example, in a triangular shape in a tread plan view.

Figure 2:
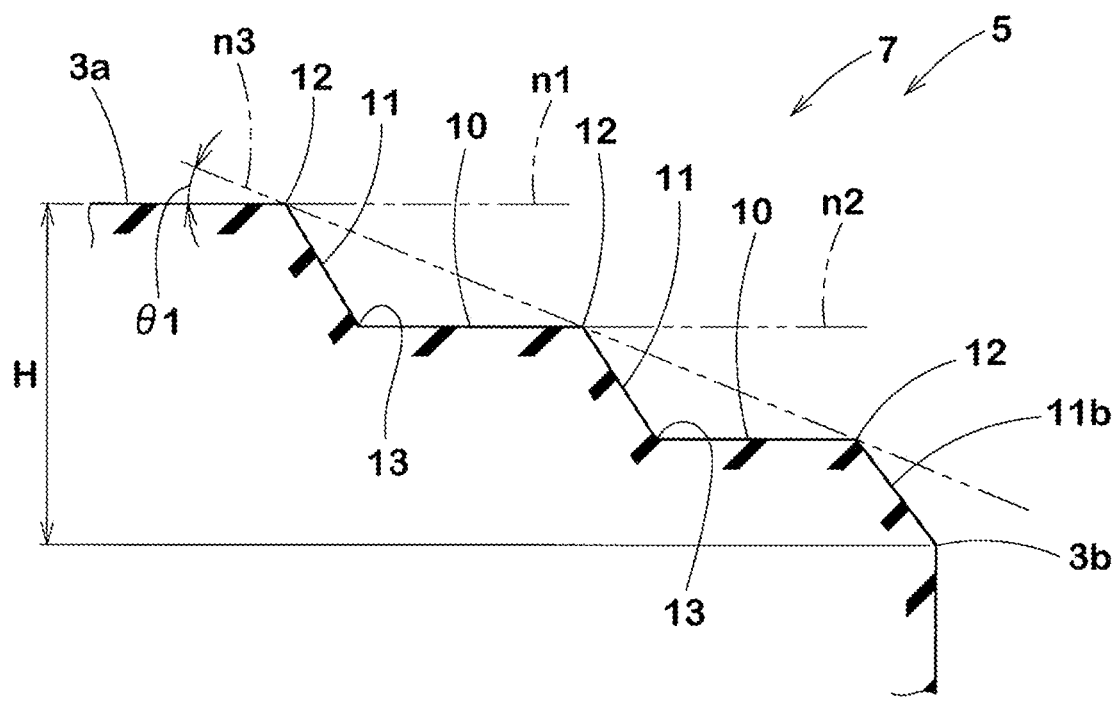
FIG. 2 is a cross-sectional view taken along a line A-A in FIG. 1.

FIG. 2 is a vertical cross-sectional view, of the block corner portion 5, passing through the top portion 3b (a cross-sectional view taken along a line A-A in FIG. 1). As shown in FIG. 2, the stepped chamfered portion 7 includes a plurality of upper surfaces 10, a plurality of vertical surfaces 11, and a plurality of step corner portions 12 which project toward the block outer side. Each upper surface 10 is formed substantially parallel to the tread surface 3a. During running on snow, such an upper surface 10 can strongly compact snow to form a hard snow column. Each vertical surface 11 extends in the block height direction. Each step corner portion 12 is formed as a result of the upper surface 10 and the vertical surface 11 or the vertical surface 11 and the tread surface 3a intersecting each other.

The "substantially parallel" includes a mode in which an angle (not shown) between a virtual line n1 obtained by extending the tread surface 3a and a virtual line n2 obtained by extending the upper surface 10 is within 10 degrees in the vertical cross-sectional view, of the block corner portion 5, passing through the top portion 3b. In addition, the "extending in the block height direction" includes a mode in which the vertical surface 11 extends at an angle (not shown) of 60 degrees or less with respect to the block height direction (orthogonal to the tread surface 3a), in addition to a mode in which the vertical surface 11 extends parallel to the block height direction.

In the present specification, dimensions and the like of components of the tire 1 are values measured in a normal state where the tire 1 is fitted on a normal rim (not shown) and inflated to a normal internal pressure and no load is applied to the tire 1. The "normal rim" is a rim that is defined, in a standard system including a standard on which the tire 1 is based, by the standard for each tire, and is, for example, the "standard rim" in the JATMA standard, the "Design Rim" in the TRA standard, or the "Measuring Rim" in the ETRTO standard.

The "normal internal pressure" is an air pressure that is defined, in a standard system including a standard on which the tire 1 is based, by the standard for each tire, and is the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard. In the case where the tire is for a passenger car, the normal internal pressure is 180 kPa.

An angle $\theta 1$ between the tread surface $3a$ and a virtual straight line $n3$ obtained by connecting the plurality of step corner portions 12 is set to 10 to 40 degrees. When the angle $\theta 1$ is set in the range of 10 to 40 degrees, both the desired volume of a snow column formed by the stepped chamfered portion 7 and the effect of treading snow can be ensured to exert a large snow column shearing force. In particular, the above effect is effectively exhibited on a compressed snow road surface in which snow is compressed. From such a viewpoint, the angle $\theta 1$ is further preferably not less than 15 degrees and even more preferably not less than 20 degrees, and is more preferably not greater than 30 degrees and even more preferably not greater than 25 degrees. If the plurality of step corner portions 12 cannot be connected by a single straight line, a virtual straight line (linear function) obtained by the least squares method using each step corner portion 12 is adopted as the virtual straight line $n3$.

In the present embodiment, the stepped chamfered portion 7 further includes a plurality of step recesses 13 which are recessed on the block inner side as a result of the upper surface 10 and the vertical surface 11 intersecting each other. In the present embodiment, the step recesses 13 are formed alternately with the step corner portions 12.

In the present embodiment, in the stepped chamfered portion 7, the upper surfaces 10 and the vertical surfaces 11 are alternately formed. In the stepped chamfered portion 7, for example, two to five upper surfaces 10 and two to five vertical surfaces 11 are formed. In the stepped chamfered portion 7 of the present embodiment, two upper surfaces 10 and three vertical surfaces 11 are formed. In the stepped chamfered portion 7, for example, an innermost vertical surface $11b$ in the block height direction forms the top portion $3b$.

Figure 3:
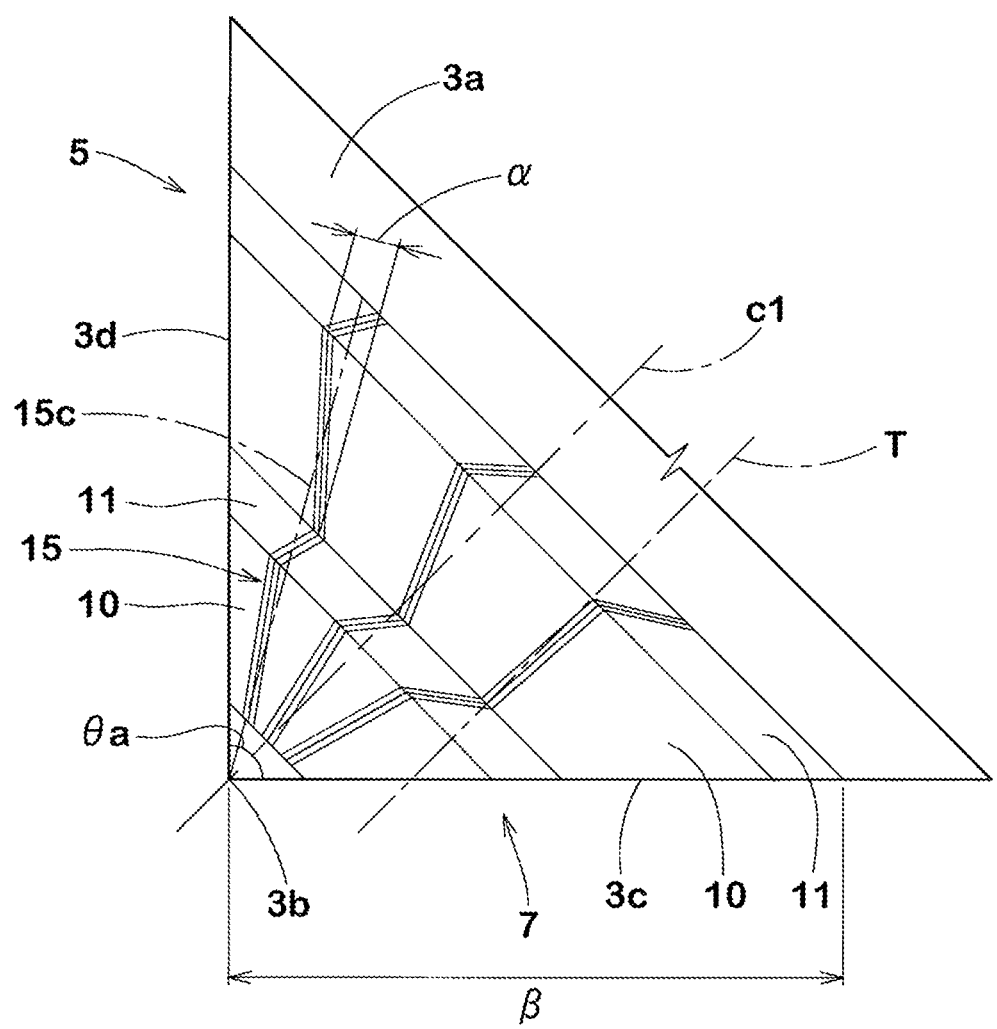
FIG. 3 is a plan view of the block in FIG. 1.

FIG. 3 is a plan view of the block corner portion 5 in FIG. 1. As shown in FIG. 3, the angle $\theta 1$ of the stepped chamfered portion 7 is an angle on a bisector $c1$ of an angle $\theta a$ formed between the first wall surface $3c$ and the second wall surface $3d$ about the top portion $3b$ in a tread plan view. In the block corner portion 5 of the present embodiment, the angle $\theta 1$ is 10 to 40 degrees in a vertical cross-section parallel to the bisector $c1$, for example, a vertical cross-section T.

In the block corner portion 5 having the stepped chamfered portion 7 formed therein, the angle $\theta a$ is not particularly limited, but is preferably not less than 30 degrees and more preferably not less than 40 degrees, and is preferably not greater than 100 degrees and more preferably not greater than 90 degrees.

As shown in FIG. 2, in the vertical cross-sectional view, for example, each of the upper surfaces 10 and the vertical surfaces 11 is formed in a straight shape. The upper surfaces 10 and the vertical surfaces 11 are not limited to such a mode, and, for example, may have an arc shape that is convex on the outer side of the block 3 or may have an arc shape that is concave on the inner side of the block 3.

Figure 4:
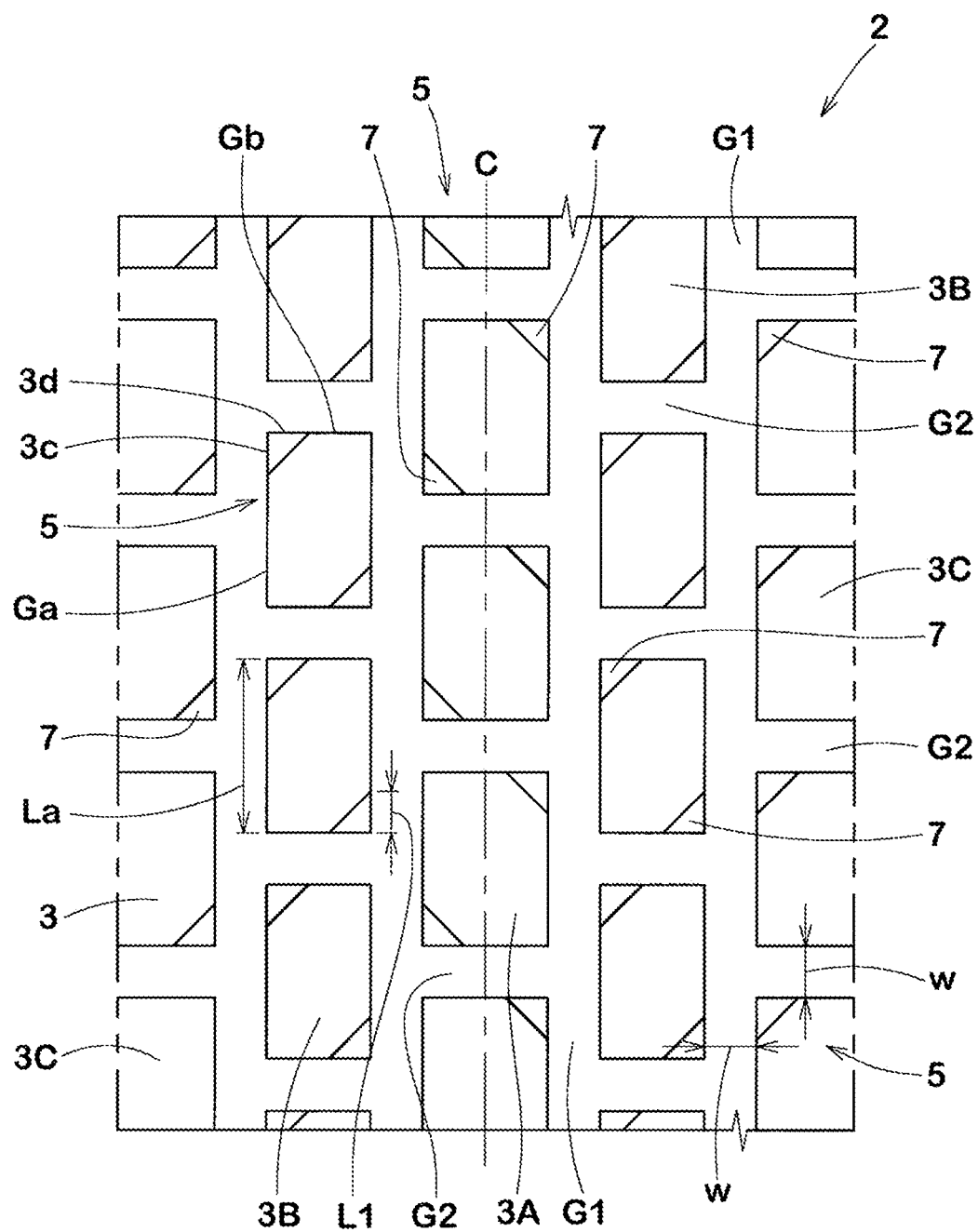
FIG. 4 is a plan view of an embodiment of a tread portion.

FIG. 4 is a plan view showing an embodiment of the tread portion 2. As shown in FIG. 4, the tread portion 2 is provided with circumferential grooves G1 extending in the tire circumferential direction and lateral grooves G2 extending in the tire axial direction. The circumferential grooves G1 and the lateral grooves G2 demarcate blocks 3.

Each circumferential groove G1 is, for example, a groove extending at an angle of 45 degrees or more with respect to the tire axial direction. Each lateral groove G2 is, for example, a groove extending at an angle less than 45 degrees with respect to the tire axial direction. In the present specification, the circumferential grooves G1 and the lateral grooves G2 are each a groove-like recess having a groove width w which is preferably not less than 1.5 mm, more preferably not less than 2.5 mm, and further preferably not less than 3.5 mm.

The blocks 3 include, for example, a crown block 3A disposed on a tire equator C, a pair of middle blocks 3B disposed on both sides in the tire axial direction of the crown block 3A, and a pair of shoulder blocks 3C disposed outward of the middle blocks 3B in the tire axial direction. The tread portion 2 is not limited to such a mode, and various shapes are adopted.

In the present embodiment, each of the blocks 3A to 3C has block corner portions 5 each located between the circumferential groove G1 and the lateral groove G2. In other words, in the present embodiment, each block corner portion 5 is formed at the intersection of the tread surface $3a$, a wall surface Ga of the circumferential groove G1, and a wall surface Gb of the lateral groove G2.

In the present embodiment, the stepped chamfered portion 7 is provided to each of the blocks 3A to 3C. In other words, the stepped chamfered portion 7 of the present embodiment extends between the wall surface Ga of the circumferential groove G1 and the wall surface Gb of the lateral groove G2. Accordingly, during running on snow, a snow column formed by the stepped chamfered portion 7 of the present embodiment is smoothly removed via the circumferential groove G1 or the lateral groove G2. In the present embodiment, the wall surface Ga of the circumferential groove G1 forms the first wall surface $3c$, and the wall surface Gb of the lateral groove G2 forms the second wall surface $3d$. A height H (shown in FIG. 2) of the stepped chamfered portion 7 is not particularly limited, but is preferably not less than 25% and further preferably not less than 33%, and is preferably not greater than 40% and further preferably not greater than 36%, of the groove depth (not shown) of the circumferential groove G1 which forms the first wall surface $3c$ or the second wall surface $3d$.

In order to maintain the stiffness of each block 3 and exert a large snow column shearing force, a length L1 in the tire circumferential direction of the first wall surface $3c$ is preferably not less than 10% and more preferably not less than 20%, and is preferably not greater than 50% and more preferably not greater than 40%, of a length La in the tire circumferential direction of the block 3.

As shown in FIG. 1, the stepped chamfered portion 7 of the present embodiment is provided with at least one rib 15 extending in the block height direction. Such a rib 15 blocks snow on the stepped chamfered portion 7, without releasing the snow, during running on snow, and thus serves to form a firm snow column. Therefore, the rib 15 further improves snow road performance.

For example, a plurality of ribs 15 are provided. In the present embodiment, three ribs 15 are provided. Accordingly, snow between adjacent ribs 15 is more blocked on the stepped chamfered portion 7, so that the snow road performance is further improved.

Each rib 15 extends, for example, in a zigzag manner Such a rib 15 has, for example, a length larger than that of a rib (not shown) extending in a straight manner, and thus can more effectively block snow. The rib 15 is not limited to such a mode, and may extend, for example, in a wavy or straight manner.

The rib 15 has a plurality of zigzag corner portions 16. Each zigzag corner portion 16 is located at the step corner portion 12 or the step recess 13. The rib 15 includes first inclined portions 15*a* which are inclined toward either the first wall surface 3*c* or the second wall surface 3*d* while extending toward the top portion 3*b*, and second inclined portions 15*b* which are connected to the first inclined portions 15*a* and which are inclined toward the side opposite to the side toward which the first inclined portions 15*a* are inclined, while extending toward the top portion 3*b*. Each zigzag corner portion 16 is formed at the position where the first inclined portion 15*a* and the second inclined portion 15*b* are connected to each other. Such a mode serves to smoothly remove snow on the upper surface 10 or the vertical surface 11.

As shown in FIG. 3, the ratio ($\alpha/\beta$) of a bending width $\alpha$ of the zigzag of the rib 15 to an inclination intercept $\beta$ of the stepped chamfered portion 7 in a tread plan view is preferably not less than 0.04, and is preferably not greater than 0.2. Since the ratio ($\alpha/\beta$) is not less than 0.04, the length of the rib 15 can be relatively long, so that the effect of blocking snow is exhibited. When the ratio ($\alpha/\beta$) exceeds 0.2, the effect of blocking snow is not enhanced, and the effect of removing snow may decrease. From such a viewpoint, the ratio ($\alpha/\beta$) is further preferably not less than 0.06 and is further preferably not greater than 0.16. The bending width $\alpha$ is the length between adjacent peaks of the zigzag in a direction orthogonal to a center line 15*c* of the amplitude of the rib 15. The inclination intercept $\beta$ is the length, on the first wall surface 3*c* or the second wall surface 3*d*, of the stepped chamfered portion 7.

Figure 5A:
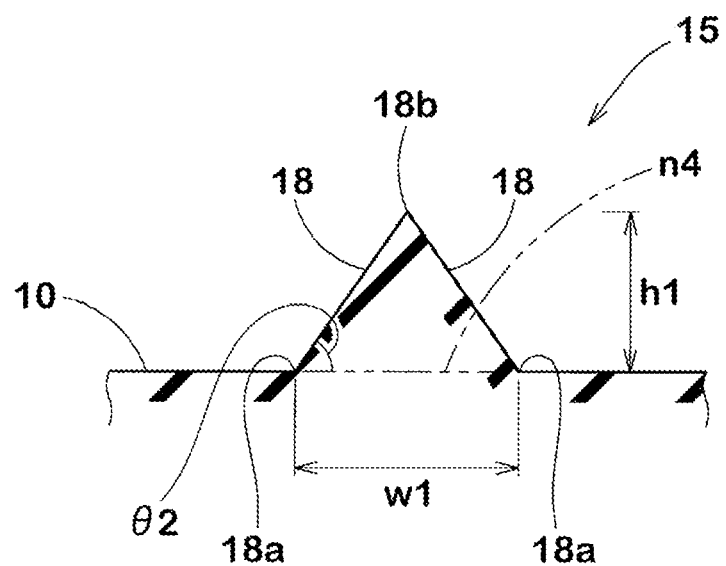
FIG. 5A is a transverse cross-sectional view of an embodiment of a rib.

FIG. 5A shows a transverse cross-section of the rib 15. As shown in FIG. 5A, a height h1 of the rib 15 is preferably not less than 0.3 mm and is preferably not greater than 2.0 mm Since the height h1 of the rib 15 is not less than 0.3 mm, the effect of blocking snow is exhibited. Since the height h1 of the rib 15 is not greater than 2.0 mm, snow is easily separated from the stepped chamfered portion 7 during running on snow, so that snow clogging is suppressed. From such a viewpoint, the height h1 of the rib 15 is more preferably not less than 0.6 mm and is more preferably not greater than 1.7 mm.

A width w1 of the rib 15 is preferably not less than 0.3 mm and is preferably not greater than 2.0 mm Since the width w1 of the rib 15 is not less than 0.3 mm, the stiffness of the rib 15 is maintained, and snow can be effectively blocked. Since the width w1 of the rib 15 is not greater than 2.0 mm, the areas of the upper surfaces 10 and the like are ensured in the stepped chamfered portion 7, and a large snow column can be formed. From such a viewpoint, the width w1 of the rib 15 is more preferably not less than 0.6 mm and is more preferably not greater than 1.7 mm.

The rib 15 has a pair of rising surfaces 18 which rise from the upper surface 10. In the transverse cross-sectional view of the rib 15, an angle $\theta 2$ between each rising surface 18 and a virtual straight line n4 connecting proximal ends 18*a* of the pair of rising surfaces 18 is preferably 30 to 90 degrees. Since the angle $\theta 2$ is not less than 30 degrees, the effect of blocking snow is effectively exhibited. Since the angle $\theta 2$ is not greater than 90 degrees, a large volume of a snow column formed by the stepped chamfered portion 7 can be ensured.

Figure 5B:
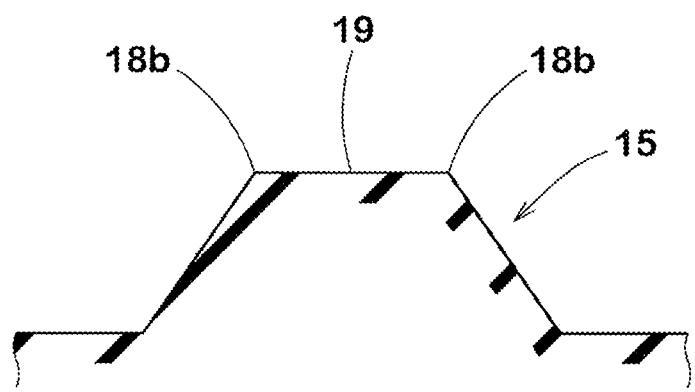
FIG. 5B is a transverse cross-sectional view of another embodiment of the rib.

The rib 15 is formed in a triangular shape in which distal ends 18*b* of the pair of rising surfaces 18 are connected to each other, in a transverse cross-section. Such a rib 15 forms a firm snow column, and can ensure a large volume of the snow column. The rib 15 may have, for example, a rectangular shape (not shown) in which the angle $\theta 2$ of each of the pair of rising surfaces 18 is 90 degrees, or a trapezoidal shape in which the distal ends 18*b* of the pair of rising surfaces 18 are connected by an outward surface 19 (shown in FIG. 5B) extending in the width direction of the rib 15.

As shown in FIG. 1, each rib 15 extends from an outermost vertical surface 11*a* in the block height direction to an innermost upper surface 10*b* in the block height direction. More specifically, the rib 15 extends from the step corner portion 12 of the vertical surface 11*a* to the step corner portion 12 of the upper surface 10*b*. Such a rib 15 has a relatively large length, and thus exhibits a great effect of blocking snow. In the present embodiment, the rib 15 is not formed on the innermost vertical surface 11*b* in the block height direction.

In the present embodiment, an interval L2 between each rib 15 gradually increases toward the outer side in the block height direction. A minimum gap Lb between the ribs 15 is not particularly limited, but is preferably not less than 0.2 mm and more preferably not less than 1 mm, and is preferably not greater than 5 mm and more preferably not greater than 3 mm. The minimum gap Lb between the ribs 15 is formed at the inner ends in the block height direction of the ribs 15.

Although the tire according to the embodiment of the present disclosure has been described in detail above, the present disclosure is not limited to the above specific embodiment, and various modifications can be made to implement the present disclosure.

EXAMPLES

Tires with a size of 215/60R16 having the basic pattern in FIG. 4 were produced as sample tires on the basis of specifications in Table 1, and were tested for snow road performance. The common specifications and the test methods for the respective sample tires are as follows. The height H of the stepped chamfered portion is the same in all examples.

Height H of stepped chamfered portion: 4 mm

<Snow Road Performance>

The respective sample tires were mounted to all the wheels of a front-wheel-drive passenger car having an engine displacement of 1500 cc, under the following conditions, and a test driver drove the vehicle on a test course having a snow road surface. The test driver made sensory evaluation for running characteristics regarding steering responsiveness, traction, grip, and the like at that time. The results are indicated as scores with the result of Comparative Example 1 being regarded as 100. The higher the value is, the better the result is.

Rim (all wheels): 16×6.5 J

Internal pressure (all wheels): 240 kPa

TABLE 1

|  | Comp. Ex. 1 | Comp. Ex. 2 | Ex. 1 | Ex. 2 | Ex. 3 | Ex. 4 | Ex. 5 | Ex. 6 |
| --- | --- | --- | --- | --- | --- | --- | --- | --- |
| θ1 (degrees) | 5 | 50 | 20 | 20 | 20 | 10 | 30 | 40 |
| θ2 (degrees) | 60 | 60 | 60 | 60 | 60 | 60 | 60 | 60 |
| Bending width/inclination intercept | 0.08 | 0.08 | 0.02 | 0.08 | 0.25 | 0.08 | 0.08 | 0.08 |
| Snow road performance [Score: higher value is better] | 100 | 98 | 107 | 115 | 109 | 111 | 115 | 113 |

As a result of the test, it is confirmed that the tire of each Example has excellent snow road performance.

In the tire according to the present disclosure, preferably, the block corner portion is formed at an intersection of the tread surface, a wall surface of a circumferential groove extending in a tire circumferential direction, and a wall surface of a lateral groove extending in a tire axial direction, and the stepped chamfered portion extends between the wall surface of the circumferential groove and the wall surface of the lateral groove.

In the tire according to the present disclosure, preferably, the stepped chamfered portion is provided with at least one rib extending in the block height direction.

In the tire according to the present disclosure, preferably, the rib extends in a zigzag manner.

In the tire according to the present disclosure, preferably, the rib has a plurality of zigzag corner portions, and each zigzag corner portion is located at the step corner portion.

In the tire according to the present disclosure, preferably, a ratio of a bending width of the zigzag of the rib to an inclination intercept of the stepped chamfered portion is 0.04 to 0.2.

In the tire according to the present disclosure, preferably, the rib has a height of 0.3 to 2.0 mm, and the rib has a width of 0.3 to 2.0 mm.

In the tire according to the present disclosure, preferably, the rib has a pair of rising surfaces rising from the upper surface, and an angle between each of the rising surfaces and a virtual straight line connecting proximal ends of the pair of rising surfaces in a transverse cross-sectional view of the rib is 30 to 90 degrees.

In the tire according to the present disclosure, preferably, the stepped chamfered portion is provided with a plurality of ribs extending in the block height direction, and an interval between each rib gradually increases toward an outer side in the block height direction.

As a result of adopting the above configuration, the tire according to the present disclosure can have improved snow road performance.

What is claimed is:

1. A tire comprising:
a tread portion including a block having a tread surface, wherein
the block has a block corner portion including a top portion protruding toward an outer side of the block, in a tread plan view,
the block corner portion has a stepped chamfered portion defined therein in which a block height decreases stepwise from the tread surface toward the top portion,
the stepped chamfered portion includes
a plurality of upper surfaces substantially parallel to the tread surface,
a plurality of vertical surfaces extending in a block height direction, and
a plurality of step corner portions, one of the step corner portions being configured to protrude toward the outer side of the block as a result of the tread surface and one of the vertical surfaces intersecting each other, and each of other step corner portions being configured to protrude toward the outer side of the block as a result of a respective one of the upper surfaces and a respective one of the vertical surfaces intersecting each other,
an angle between the tread surface and a virtual straight line connecting the plurality of step corner portions in a vertical cross-sectional view, of the block corner portion, passing through the top portion is 10 to 40 degrees, and
the stepped chamfered portion includes at least one rib extending in the block height direction.

2. The tire according to claim 1, wherein
the block corner portion is configured at an intersection of the tread surface, a wall surface of a circumferential groove extending in a tire circumferential direction, and a wall surface of a lateral groove extending in a tire axial direction, and
the stepped chamfered portion extends between the wall surface of the circumferential groove and the wall surface of the lateral groove.

3. The tire according to claim 1, wherein the rib extends in a zigzag manner.

4. The tire according to claim 1, wherein
the rib has a plurality of zigzag corner portions, and
each of the zigzag corner portions is located at a respective one of the step corner portions.

5. The tire according to claim 1, wherein a ratio of a bending width of the zigzag of the rib to an inclination intercept of the stepped chamfered portion is 0.04 to 0.2.

6. The tire according to claim 1, wherein
the rib has a height of 0.3 to 2.0 mm, and
the rib has a width of 0.3 to 2.0 mm.

7. The tire according to claim 1, wherein
the rib has a pair of rising surfaces rising from at least one of the upper surfaces, and
an angle between each of the rising surfaces and a virtual straight line connecting proximal ends of the pair of rising surfaces in a transverse cross-sectional view of the rib is 30 to 90 degrees.

8. The tire according to claim 1, wherein
a height of the stepped chamfered portion is 25% to 40% of a groove depth of a circumferential groove extending in a tire circumferential direction which defines a first wall surface of the block or a second wall surface of the block.

9. The tire according to claim 1, wherein
a length in a tire circumferential direction of a first wall surface defining the stepped chamfered portion of the block is 10% to 50% of a length in the tire circumferential direction of the block.

10. The tire according to claim 1, wherein
the stepped chamfered portion includes a plurality of ribs extending in the block height direction, and
a minimum gap between the ribs is 0.2 to 5 mm.

11. A tire comprising:
a tread portion including a block having a tread surface, wherein
the block has a block corner portion including a top portion protruding toward an outer side of the block, in a tread plan view,
the block corner portion has a stepped chamfered portion defined therein in which a block height decreases stepwise from the tread surface toward the top portion,
the stepped chamfered portion includes
    a plurality of upper surfaces substantially parallel to the tread surface,
    a plurality of vertical surfaces extending in a block height direction,
    a plurality of step corner portions, one of the step corner portions being configured to protrude toward the outer side of the block as a result of the tread surface and one of the vertical surfaces intersecting each other, and each of other step corner portions being configured to protrude toward the outer side of the block as a result of a respective one of the upper surfaces and a respective one of the vertical surfaces intersecting each other, and
    at least one rib extending in the block height direction and extending in a zigzag manner, the rib having a plurality of zigzag corner portions, and each of the zigzag corner portions being located at a respective one of the step corner portions, and
an angle between the tread surface and a virtual straight line connecting the plurality of step corner portions in a vertical cross-sectional view, of the block corner portion, passing through the top portion is 10 to 40 degrees.

12. The tire according to claim 11, wherein a ratio of a bending width of the zigzag of the rib to an inclination intercept of the stepped chamfered portion is 0.04 to 0.2.

13. The tire according to claim 11, wherein
the rib has a height of 0.3 to 2.0 mm, and
the rib has a width of 0.3 to 2.0 mm.

14. The tire according to claim 11, wherein
the rib has a pair of rising surfaces rising from at least one of the upper surfaces, and
an angle between each of the rising surfaces and a virtual straight line connecting proximal ends of the pair of rising surfaces in a transverse cross-sectional view of the rib is 30 to 90 degrees.

15. The tire according to claim 11, wherein
a height of the stepped chamfered portion is 25% to 40% of a groove depth of a circumferential groove extending in a tire circumferential direction which defines a first wall surface of the block or a second wall surface of the block.

16. The tire according to claim 11, wherein
a length in a tire circumferential direction of a first wall surface defining the stepped chamfered portion of the block is 10% to 50% of a length in the tire circumferential direction of the block.

17. The tire according to claim 11, wherein
the stepped chamfered portion includes a plurality of the ribs extending in the block height direction, and
a minimum gap between the ribs is 0.2 to 5 mm.

18. A tire comprising:
a tread portion including a block having a tread surface, wherein
the block has a block corner portion including a top portion protruding toward an outer side of the block, in a tread plan view,
the block corner portion has a stepped chamfered portion defined therein in which a block height decreases stepwise from the tread surface toward the top portion,
the stepped chamfered portion includes
    a plurality of upper surfaces substantially parallel to the tread surface,
    a plurality of vertical surfaces extending in a block height direction, and
    a plurality of step corner portions, one of the step corner portions being configured to protrude toward the outer side of the block as a result of the tread surface and one of the vertical surfaces intersecting each other, and each of other step corner portions being configured to protrude toward the outer side of the block as a result of a respective one of the upper surfaces and a respective one of the vertical surfaces intersecting each other,
an angle between the tread surface and a virtual straight line connecting the plurality of step corner portions in a vertical cross-sectional view, of the block corner portion, passing through the top portion is 10 to 40 degrees,
the stepped chamfered portion includes a plurality of ribs extending in the block height direction, and
an interval between each rib increases toward an outer side in the block height direction.

* * * * *